US010762223B2

(12) United States Patent
Duan

(10) Patent No.: US 10,762,223 B2
(45) Date of Patent: Sep. 1, 2020

(54) MANDATORY ACCESS CONTROL METHOD AND APPARATUS, AND PHYSICAL HOST

(71) Applicant: HUAWEI TECHNOLOGIES CO., LTD., Shenzhen, Guangdong (CN)

(72) Inventor: Bin Duan, Santiago (CL)

(73) Assignee: Huawei Technologies Co., Ltd., Shenzhen (CN)

(*) Notice: Subject to any disclaimer, the term of this patent is extended or adjusted under 35 U.S.C. 154(b) by 147 days.

(21) Appl. No.: 15/920,007

(22) Filed: Mar. 13, 2018

(65) Prior Publication Data
US 2018/0204016 A1     Jul. 19, 2018

Related U.S. Application Data

(63) Continuation of application No. PCT/CN2017/070705, filed on Jan. 10, 2017.

(30) Foreign Application Priority Data

Jan. 11, 2016    (CN) .......................... 2016 1 0017077

(51) Int. Cl.
*G06F 21/62*     (2013.01)
*G06F 21/53*     (2013.01)
(Continued)

(52) U.S. Cl.
CPC .......... *G06F 21/62* (2013.01); *G06F 9/45558* (2013.01); *G06F 21/44* (2013.01);
(Continued)

(58) Field of Classification Search
CPC ........ G06F 21/62; G06F 21/604; G06F 21/44; G06F 9/45558; G06F 2009/45591;
(Continued)

(56) References Cited

U.S. PATENT DOCUMENTS

2008/0022376 A1   1/2008   Ke et al.
2009/0222880 A1   9/2009   Mayer et al.
(Continued)

FOREIGN PATENT DOCUMENTS

CN    101094097 A    12/2007
CN    101452397 A    6/2009
(Continued)

OTHER PUBLICATIONS

Guanhai Wang,"A Mandatory Access Control Mechanism in Virtual Machine Systems",Shanghai Jiao Tong University,dated Jan. 2010,total 81 pages.
(Continued)

*Primary Examiner* — Mohammad W Reza
(74) *Attorney, Agent, or Firm* — Fish & Richardson P.C.

(57) ABSTRACT

A mandatory access control method and apparatus, and a physical host are disclosed. The method includes obtaining, by a virtual machine monitor (VMM) from at least one virtual machine, M input/output access instructions delivered by a user, where each of the M access instructions includes an access subject and an access object. According to the subject and the object of each of the M access instructions, the VMM determines N access instructions that comply with a preset mandatory access rule. The VMM accesses a physical device corresponding to the object of each of the N access instructions.

16 Claims, 7 Drawing Sheets

(51) Int. Cl.
*G06F 9/455* (2018.01)
*G06F 21/44* (2013.01)
*G06F 21/60* (2013.01)

(52) U.S. Cl.
CPC ............ *G06F 21/53* (2013.01); *G06F 21/604* (2013.01); *G06F 2009/45587* (2013.01); *G06F 2009/45591* (2013.01); *G06F 2221/2113* (2013.01)

(58) Field of Classification Search
CPC .......... G06F 2009/45587; G06F 21/53; G06F 2221/2113; G06F 2221/2141
USPC .......................................................... 726/1
See application file for complete search history.

(56) References Cited

U.S. PATENT DOCUMENTS

| | | | |
|---|---|---|---|
| 2010/0058340 A1 | 3/2010 | Kamada | |
| 2015/0128209 A1* | 5/2015 | Clevy | G06F 21/53 726/1 |
| 2016/0104004 A1* | 4/2016 | Vadapandeshwara | G06F 21/604 726/1 |
| 2017/0185753 A1* | 6/2017 | Yang | G06F 21/10 |

FOREIGN PATENT DOCUMENTS

| | | |
|---|---|---|
| CN | 102446087 A | 5/2012 |
| CN | 103312722 A | 9/2013 |
| CN | 103997502 A | 8/2014 |
| CN | 104508676 A | 4/2015 |
| CN | 104573553 A | 4/2015 |
| CN | 105701416 A | 6/2016 |
| FR | 2929733 A1 | 10/2009 |

OTHER PUBLICATIONS

GB17859-1999,"Classified criteria for security protection of Computer information system",The state bureau of quality and technical supervision,dated Sep. 13, 1999,total 22 pages.
International Search Report issued in International Application No. PCT/CN2017/070705 dated Apr. 13, 2017, 15 pages.
Chinese Office Action issued in Chinese Application No. 201610017077.9 dated Jan. 17, 2018, 9 pages.
Extended European Search Report issued in European Application No. 17738119.1 dated Sep. 28, 2018, 5 pages.

* cited by examiner

MANDATORY ACCESS CONTROL METHOD AND APPARATUS, AND PHYSICAL HOST

CROSS-REFERENCE TO RELATED APPLICATIONS

This application is a continuation of International Application No. PCT/CN2017/070705, filed on Jan. 10, 2017, which claims priority to Chinese Patent Application No. 201610017077.9, filed on Jan. 11, 2016. The disclosures of the aforementioned applications are hereby incorporated by reference in their entireties.

TECHNICAL FIELD

This application relates to the field of virtual machines, and more specifically, to a mandatory access control method and apparatus, and a physical host.

BACKGROUND

Currently, different industries such as education, enterprise, government, military, operator, health care, and finance have different security requirements. At present, products used in all industries have met a normal security requirement, but scarcely meet a high-level security requirement.

Access control is one of the security requirement, and includes discretionary access control and mandatory access control. A security standard such as GB17859-1999 specifies that a security system with three or more levels need to use the mandatory access control. The mandatory access control is an industry threshold for protecting core content of the military industry, the government, and the like, and is a future development direction of the access control.

The discretionary access control is currently implemented in multiple types of operating systems. The discretionary access control in the existing multiple types of operating systems is often implemented by using discretionary access control similar to that of a Linux operating system. The discretionary access control means that an owner of an object can determine permission to access the object by others. The Linux operating system implements discretionary access control that is based on a "permission bit". The permission bit is divided into three categories: "owner", "group", and "other". When a user determines to transmit an object message to another user, the user can select only permission of "group" or "other", and this is similar to a sharing strategy. A discretionary access control mechanism based on the permission bit has coarse granularity, and cannot be adapted to a scenario with relatively strict security. The mandatory access control requires allocating security classifications to a subject and an object in a system. When the subject requests an access to the object, the system performs permission (readable/writable) determining according to the security classifications of the subject and the object and an access type.

During implementation of the mandatory access control at an operating system layer, a kernel mechanism usually needs to be modified, and a difference between different systems also needs to be considered. Consequently, the implementation is extremely difficult. Currently, there are undiversified manners for implementing the mandatory access control, and only some customized systems implement the mandatory access control. SELinux is a security enhancement module developed based on Linux. By modifying a kernel and user space and expanding an existing GNU/Linux operating system, mandatory access control based on a type enforce (TE) strategy is implemented. For each access, the SELinux makes labels for an access subject and object by modifying kernel mode code of the GNU/Linux operating system, so that a program implements the mandatory access control over each access according to the labels. The solution is implemented by modifying the kernel mode code of the GNU/Linux operating system, and cannot be applied to another operating system. Therefore, an SELinux access is not supported in a Windows operating system, and the solution brings a 5% to 10% performance loss to the GNU/Linux operating system.

SUMMARY

This application provides a mandatory access control method and apparatus, and a physical host, so as to flexibly implement mandatory access control without modifying an operating system.

This application is based on a fact that a virtual machine monitor VMM manages mandatory access control inside a virtual machine. The VMM is configured to obtain and execute an access instruction from the virtual machine. Therefore, the mandatory access control may be more flexibly implemented in the VMM, an operating system does not need to be modified, and system compatibility is better.

According to a first aspect, this application provides a mandatory access control method including: obtaining, by a virtual machine monitor VMM from at least one virtual machine, M access instructions delivered by a user, where each of the M access instructions includes an access subject and an access object, and M is a positive integer; determining, by the VMM according to the subject and the object of each of the M access instructions, N access instructions that comply with a preset mandatory access rule, where N is a positive integer less than or equal to M; and accessing, by the VMM, a hardware layer device corresponding to the object of each of the N access instructions.

The M access instructions are generated in a user mode of the virtual machine by the user and delivered to a kernel mode of the virtual machine.

In this application, the accessed hardware layer device may be integrated in a physical host on which the virtual machine monitor VMM and the at least one virtual machine run, or may exist on another physical host.

To accelerate determining by the VMM whether an access instruction complies with the mandatory access rule, in a possible implementation of the first aspect, multiple accesses delivered by a same virtual machine may be combined according to whether the accesses have a same subject security classification and a same object security classification. Specifically, M is a positive integer greater than or equal to 2, all the M access instructions are obtained from a first virtual machine, and the determining, by the VMM according to the subject and the object of each of the M access instructions, N access instructions that comply with a preset mandatory access rule includes: combining, by the VMM, access instructions that are of the M access instructions and that have a same subject security classification and a same object security classification, to obtain K access instructions, where K is a positive integer less than M; and determining, by the VMM from the K access instructions according to a subject security classification and an object security classification of each of the K access instructions, the N access instructions that comply with the mandatory access rule, where N is a positive integer less than or equal to K.

Likewise, to accelerate determining by the VMM whether an access complies with the mandatory access rule, in another possible implementation of the first aspect, multiple accesses delivered by a same virtual machine may be combined according to whether the accesses have a same subject and a same object. Specifically, M is a positive integer greater than or equal to 2, all the M access instructions are obtained from a first virtual machine, and the determining, by the VMM according to the subject and the object of each of the M access instructions, N access instructions that comply with a preset mandatory access rule includes: combining, by the VMM, access instructions that are of the M access instructions and that have a same subject and a same object, to obtain K access instructions, where K is a positive integer less than M; and determining, by the VMM from the K access instructions according to a subject security classification and an object security classification of each of the K access instructions, the N access instructions that comply with the mandatory access rule, where N is a positive integer less than or equal to K.

For the foregoing two possible implementations of the first aspect, the mandatory access rule may be designed as follows: The mandatory access rule includes a subject security rule, an object security rule, and a security determining rule, and the determining, by the VMM from the K access instructions according to a subject security classification and an object security classification of each of the K access instructions, the N access instructions that comply with the mandatory access rule includes: determining, by the VMM, the subject security classification of each of the K access instructions according to the subject of each of the K access instructions and the subject security rule; determining, by the VMM, the object security classification of each of the K access instructions according to the object of each of the K access instructions and the object security rule; and determining, by the VMM according to the subject security classification and the object security classification, whether each of the K access instructions complies with the security determining rule, and determining that an access instruction that complies with the security determining rule is one of the N access instructions.

The subject security rule, the object security rule, and the security determining rule are separately designed. The subject security rule includes a correspondence between a subject and a subject security classification, the object security rule includes a correspondence between an object and an object security classification, and the security determining rule includes a correspondence among a subject security classification, an object security classification, and a subject security classification-object security classification determining result. In an implementation, the subject security rule, the object security rule, and the security determining rule are respectively corresponding to three tables.

Further, to improve a hit rate of querying the mandatory access rule, a subject cache table and an object cache table are set in the mandatory access rule. The subject cache table is used to store a correspondence between subjects of last L access instructions of a user and subject security classifications, and the object cache table is used to store a correspondence between objects of the last L access instructions of the user and object security classifications. The determining, by the VMM, the subject security classification of each of the K access instructions according to the subject of each of the K access instructions and the subject security rule includes: for the subject of each of the K access instructions, determining, by the VMM, the subject security classification of each of the K access instructions according to the correspondence between the subjects and the subject security classifications in the subject cache table. The determining, by the VMM, the object security classification of each of the K access instructions according to the object of each of the K access instructions and the object security rule includes: for the object of each of the K access instructions, determining, by the VMM, the object security classification of each of the K access instructions according to the correspondence between the objects and the object security classifications in the object cache table.

In another possible implementation of the first aspect, M is a positive integer greater than or equal to 2, the M access instructions include P access instructions obtained from a first virtual machine and S access instructions obtained from a second virtual machine, where both P and S are positive integers, and a sum of P and S is less than or equal to M, a mandatory access rule corresponding to the first virtual machine includes a first subject security rule, a first object security rule, and a first security determining rule, a mandatory access rule corresponding to the second virtual machine includes a second subject security rule, a second object security rule, and a second security determining rule, and the first security determining rule and the second security determining rule are the same; and the determining, by the VMM according to the subject and the object of each of the M access instructions, N access instructions that comply with a preset mandatory access rule includes: combining, by the VMM according to the first subject security rule and the first object security rule, access instructions that are of the P access instructions and that have a same subject security classification and a same object security classification, to obtain Q access instructions, where Q is a positive integer less than or equal to P; combining, by the VMM according to the second subject security rule and the second object security rule, access instructions that are of the S access instructions and that have a same subject security classification and a same object security classification, to obtain T access instructions, where T is a positive integer less than or equal to S; combining, by the VMM, access instructions that are of the Q access instructions and the T access instructions and that have a same subject security classification and a same object security classification, to obtain K access instructions, where K is a positive integer less than M; and determining, by the VMM from the K access instructions according to a subject security classification and an object security classification of each of the K access instructions, the N access instructions that comply with the first security determining rule, where N is a positive integer less than or equal to K.

In specific implementation, an access instruction may be obtained by using an input/output (IO) ring and a front-end driver of a kernel mode. The obtaining, by a virtual machine monitor VMM from a virtual machine, M input/output access instructions delivered by a user includes: obtaining, by the VMM, the M access instructions from the front-end driver of the kernel mode of the virtual machine by using the IO ring.

In specific implementation, the physical device may be accessed by using a back-end driver. The accessing, by the VMM, a physical device corresponding to the object of each of the N access instructions includes: accessing, by the VMM by using the back-end driver, the physical device corresponding to the object of each of the N access instructions.

It should be understood that in an implementation, the method is applied to a physical host, and the physical host includes a hardware layer, the VMM running on the hardware layer, and at least one virtual machine running on the VMM.

A second aspect provides a mandatory access control apparatus including: an obtaining module, configured to obtain, from at least one virtual machine, M access instructions delivered by a user, where each of the M access instructions includes an access subject and an access object, and M is a positive integer; a determining module, configured to determine, according to the subject and the object of each of the M access instructions obtained by the obtaining module, N access instructions that comply with a preset mandatory access rule, where N is a positive integer less than or equal to M; and an access module, configured to access a hardware layer device corresponding to the object of each of the N access instructions determined by the determining module.

It should be understood that all modules of the mandatory access control apparatus in the second aspect may be configured to implement the mandatory access control method in the first aspect, and details are not described herein.

In a specific implementation, the mandatory access control apparatus in the second aspect is a virtual machine monitor VMM.

In a specific implementation, the access module may be a back-end driver of a virtual machine monitor VMM.

A third aspect provides a physical host, the physical host includes a hardware layer, a virtual machine monitor VMM running on the hardware layer, and at least one virtual machine running on the VMM, and the VMM is configured to perform the mandatory access control method according to the first aspect and the corresponding implementations.

In this application, the VMM may also be referred to as a hypervisor.

In this application, the access instructions may include at least one of a read request or a write request. Alternatively, the access instructions may include at least one of an input access instruction or an output access instruction.

In this application, the subject of the mandatory access control may be a user or a process of the virtual machine, and the object may be a file or data.

Based on the foregoing technical solutions, the mandatory access control method and apparatus, and the physical host in this application are based on a fact that a VMM manages mandatory access control inside a virtual machine, and the VMM obtains and implements an access instruction from the virtual machine, so that implementation of the mandatory access control is more flexible, an operating system does not need to be modified, and system compatibility is better. The mandatory access control method in this application has fewer performance overheads, and is more favorable to delivery and deployment of a large batch of mandatory access control inside multiple virtual machines in different operating systems.

According to the mandatory access control method and apparatus, and the physical host in this application, multiple accesses delivered by a same virtual machine may be combined according to whether the accesses have a same subject security classification and a same object security classification, so as to reduce a quantity of times for determining whether an access instruction complies with a mandatory access rule, and accelerate determining by a VMM whether the access instruction complies with the mandatory access rule.

According to the mandatory access control method and apparatus, and the physical host in this application, multiple accesses delivered by a same virtual machine may be combined according to whether the accesses have a same subject and a same object, so as to reduce a quantity of times for determining whether an access instruction complies with a mandatory access rule, and accelerate determining by a VMM whether the access instruction complies with the mandatory access rule.

According to the mandatory access control method and apparatus, and the physical host in this application, a subject security rule, an object security rule, and a security determining rule may be separately designed, so that a VMM can more efficiently find a corresponding rule when determining an access instruction, and determining by the VMM whether an access instruction complies with a mandatory access rule is accelerated.

According to the mandatory access control method and apparatus, and the physical host in this application, cache tables may be set for frequently-used subject security rules and object security rules, and the cache tables are first searched for a subject security classification and an object security classification, so that a VMM can more efficiently find a corresponding rule when determining an access instruction, and determining by the VMM whether an access instruction complies with a mandatory access rule is accelerated.

DESCRIPTION OF EMBODIMENTS

Figure 1:
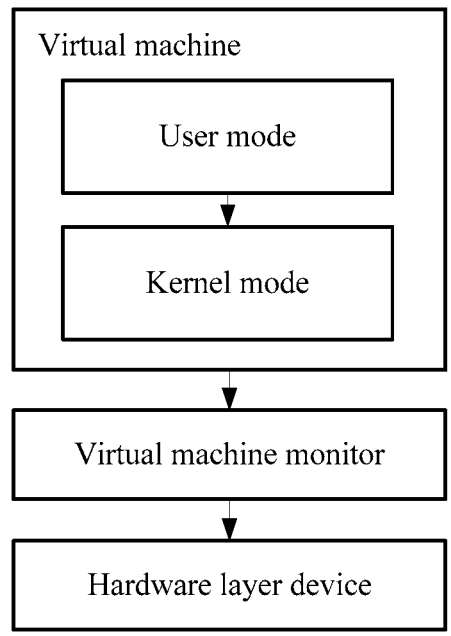
FIG. 1 is a schematic diagram of a virtual machine architecture.

The following describes technical solutions of this application with reference to accompanying drawings.

A method, an apparatus, and a physical host in embodiments of the present application may be applied to a virtual machine architecture including multiple operating systems. For example, the method, the apparatus, and the physical host may be applied to a virtual machine architecture including one or more operating systems of Linux, Windows, Unix, or the like. The virtual machine architecture may further include other operating systems, and this is not limited in the embodiments of the present application.

The embodiments of the present application relate to access control, and in particular, to mandatory access control. The following briefly describes related concepts.

The access control is a core of an information security assurance mechanism, and is a main means of implementing a data privacy and integrity mechanism. The access control is to limit permission to access an access object (a resource that needs to be protected) by an access subject (or referred to as an initiator that is an active entity including a user, a process, a service, and the like) in an access instruction, so that a computer system is used within an authorized range. An access control mechanism determines what a user and a program representing user interests can do, and to what extent. As a main means of providing information security assurance and a most noticeable security mechanism, the access control is widely applied to multiple aspects, such as a firewall, a file access, a virtual private network (VPN), and physical security.

The access control may be divided into two categories: 1) mandatory access control (MAC), and 2) discretionary access control (DAC). The following mainly describes a related definition and principle of the mandatory access control.

The MAC originates from a requirement of information confidentiality and prevention of an attack of the Trojan horse or the like. The MAC prevents direct or indirect illegal intrusion by using an inevitable access restriction. Under the mandatory access control, each of a user (or another subject) and a file (or another object) is marked with a fixed security attribute (such as a security classification or access permission). For every access, the system checks the security attribute to determine whether the user has permission to access the file. The security attribute is mandatory, and is allocated by a security administrator (Security Officer). A user or a user process cannot change a security attribute of the user or the user process or another subject/object.

Originally, the MAC is mainly used in military applications, and is usually used in combination with the DAC. A subject cannot access an object before passing DAC and MAC checks. The MAC exerts stricter access control on the object. Therefore, program stealing by the Trojan horse or the like can be prevented, and in addition, the MAC has a capability for preventing a user from accidentally leaking confidential information.

The mandatory access control is "mandatory" for the access subject, that is, a system compels the subject to obey the access control. A main characteristic of the MAC is imposing mandatory access control on all subjects and objects (such as a process, a file, a segment, and a device) controlled by the subjects. An idea of the mandatory access control is that all subjects have fixed security classifications, all objects also have fixed security classifications, and whether a subject performs a specific operation on an object is determined by a relationship between security classifications of the subject and the object.

In specific implementation, a security classification is allocated to each subject (such as a user or a process) and object (such as a file and data). For example, a security classification may include Top Secret, Secret, Confidential, and Unclassified. A classification relationship is T>S>C>U. The system determines whether a subject has permission to access an object according to security classifications of the access subject and object.

Virtualization technologies are increasingly applied to various industries with an information and communications technology (ICT).

A virtual machine monitor (VMM) is a core for all virtualization technologies. A VMM in the embodiments of the present application is an intermediate software layer running between a physical server and an operating system. The VMM may allow multiple operating systems and applications to share a set of basic physical hardware. Therefore, the VMM may also be regarded as a "meta" operating system in a virtual circumstance, and the VMM can coordinate accesses to all hardware layer devices and virtual machines on a server. The VMM may also be referred to as a hypervisor, and a basic function of the VMM is continuously supporting migration of multiple workloads. When the server is started and runs the VMM, the server allocates an appropriate memory, CPU, network, and disk to each virtual machine, and loads guest operating systems of all virtual machines.

In the embodiments of the present application, the mandatory access control is implemented exactly based on the virtualization technologies and the VMM.

With reference to accompanying drawings, the following describes in detail a mandatory access control method and apparatus, and a physical host in the embodiments of the present application.

The embodiments of the present application are based on a fact that a VMM manages mandatory access control inside a virtual machine. The VMM is configured to obtain and execute an access instruction from the virtual machine. Therefore, the mandatory access control may be more flexibly implemented in the VMM, an operating system does not need to be modified, and system compatibility is better. Herein, the access instruction may include a read request and/or a write request. In other words, the access instruction may include an input access instruction and/or an output access instruction.

FIG. 1 is a schematic diagram of a virtual machine architecture. As shown in FIG. 1, a virtual machine includes a user mode and a kernel mode. A user sends a variety of instructions in the user mode of the virtual machine, and the instruction sent by the user is generated in the user mode of the virtual machine and delivered to the kernel mode of the virtual machine. The virtual machine architecture (or system) may include one or more virtual machines. A VMM under the virtual machine and communicatively connected to the virtual machine is configured to manage the foregoing one or more virtual machines. A hardware layer device under the VMM is communicatively connected to the VMM. Therefore, in the virtual machine architecture, the one or more virtual machines may access the hardware layer device by using the VMM. Unlike an existing technology in which mandatory access control is implemented by modifying a kernel mode program, in this embodiment of the present application, the mandatory access control over a subject and an object shifts from the kernel mode to the VMM.

In this embodiment of the present application, during the mandatory access control, a subject may be a user or a process of the virtual machine, and an object may be a file or data. It should be understood that the access instruction in this specification may also be referred to as an "access".

Figure 2:
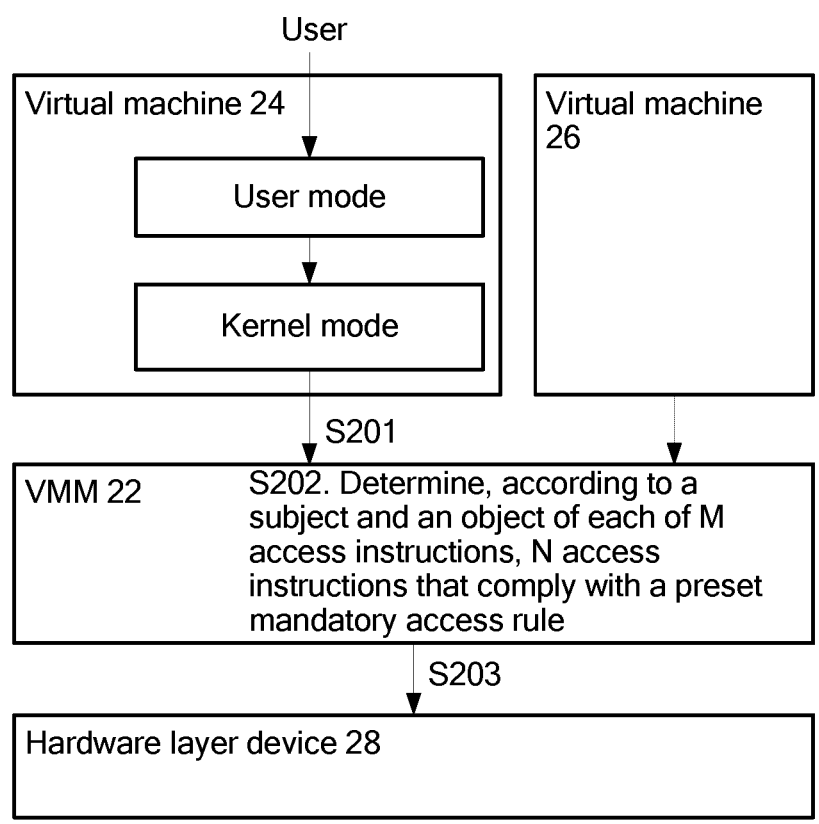
FIG. 2 is a schematic flowchart of a mandatory access control method according to an embodiment of the present application.

FIG. 2 is a schematic flowchart of a mandatory access control method 200 according to an embodiment of the present application. The method 200 includes the following steps.

S201. A VMM 22 obtains, from at least one virtual machine (such as a virtual machine 24 and a virtual machine 26), M access instructions delivered by a user, where each of the M access instructions includes an access subject and an access object, M is a positive integer, and the M access instructions may be generated in a user mode of the virtual machine 24 by the user and delivered to a kernel mode of the virtual machine 24.

In specific implementation, that a VMM obtains, from a virtual machine, M access instructions delivered by a user may include: obtaining, by the VMM, the M access instructions from a front-end driver of the kernel mode of the virtual machine by using an IO ring. The IO ring is a bridge for communication between the virtual machine and the VMM, and the IO ring delivers an IO ring request to the VMM from the front-end driver of the kernel mode of the virtual machine each time. One IO ring request may include the M access instructions, and each of the M access instructions includes one access subject and one access object. FIG. 2 shows the virtual machine 24 and the virtual machine 26 only as an example. In addition to the virtual machine 24 and the virtual machine 26, a system may further include other virtual machines, and the VMM 22 may also obtain an access instruction from another virtual machine. This is not limited in this embodiment of the present application.

S202. The VMM 22 determines, according to the subject and the object of each of the M access instructions, N access instructions that comply with a preset mandatory access rule, where N is a positive integer less than or equal to M.

The mandatory access rule may directly include a correspondence among a subject, an object, and a subject-object determining result. Alternatively, the mandatory access rule may include a correspondence among a subject, a subject security classification, an object, and an object security classification, and a security determining rule, and the security determining rule includes a correspondence among a subject security classification, an object security classification, and a subject security classification-object security classification determining result. Alternatively, the mandatory access rule may include a correspondence between a subject and a subject security classification (that is, a subject security rule), a correspondence between an object and an object security classification (that is, an object security rule), and the foregoing security determining rule. The mandatory access rule may be designed in another way, and this is not limited in this embodiment of the present application.

A data block index may be created for the mandatory access rule (such as BLP-info) according to the subject, the object, and the determining results of the subject and the object, so as to implement a rapid matching query. When the system includes multiple virtual machines, different virtual machines may have different security classifications for same subjects or same objects, or different virtual machines may have different security classification determining rules for subjects and objects. Therefore, a virtual machine field may be further added to the mandatory access rule.

When the system includes multiple virtual machines, a configuration template may be created for the mandatory access rule according to a virtual machine service or an operating system type. For example, the configuration template may be a Linux Apache server mandatory access rule template and a Windows Exchange server mandatory access rule template. The user or an operation and maintenance engineer usually does not need to formulate a specific rule, and only needs to perform template deployment according to the type.

There may be multiple specific manners for determining, according to the subject and the object of each of the M access instructions, the N access instructions that comply with the mandatory access rule, and detailed descriptions are provided in the following.

S203. The VMM 22 accesses a hardware layer device (or referred to as a "physical device") corresponding to the object of each of the N access instructions. For an access instruction of the M access instructions that does not comply with the mandatory access rule, a failure is returned. Specifically, when an access subject and an access object comply with the mandatory access rule, the VMM 22 accesses a hardware layer device 28 corresponding to the object, and the VMM returns an access result to the virtual machine 24 after the access succeeds. When an access subject and an access object do not comply with the mandatory access rule, a failure is directly returned for the access instruction.

It should be understood that in this embodiment of the present application, the accessed hardware layer device may be integrated in a physical host on which the virtual machine monitor VMM and the at least one virtual machine run, or may exist on another physical host.

The method in this embodiment of the present application is based on a fact that a VMM manages mandatory access control inside a virtual machine. The VMM obtains and executes an access instruction from the virtual machine. Therefore, implementation of the mandatory access control is more flexible, the operating system does not need to be modified, and system compatibility is better.

Figure 3:
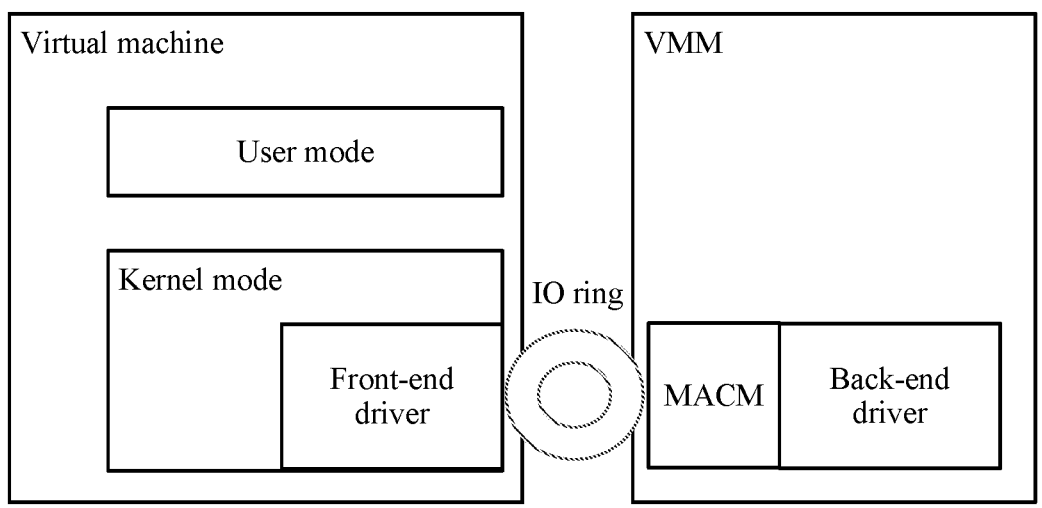
FIG. 3 is a schematic diagram of a mandatory access control module according to an embodiment of the present application.

According to the mandatory access control method in this embodiment of the present application, obtaining an access instruction from a kernel mode of a virtual machine, and determining an access instruction that complies with a mandatory access rule are implemented by using a mandatory access control module of a VMM in an embodiment. The module may be referred to as a mandatory access control module (MACM). A specific location of the module disposed in the VMM may be shown in FIG. 3, that is, the MACM may be at a location between an IO ring and a back-end driver in a virtual machine IO processing mechanism.

Figure 4:
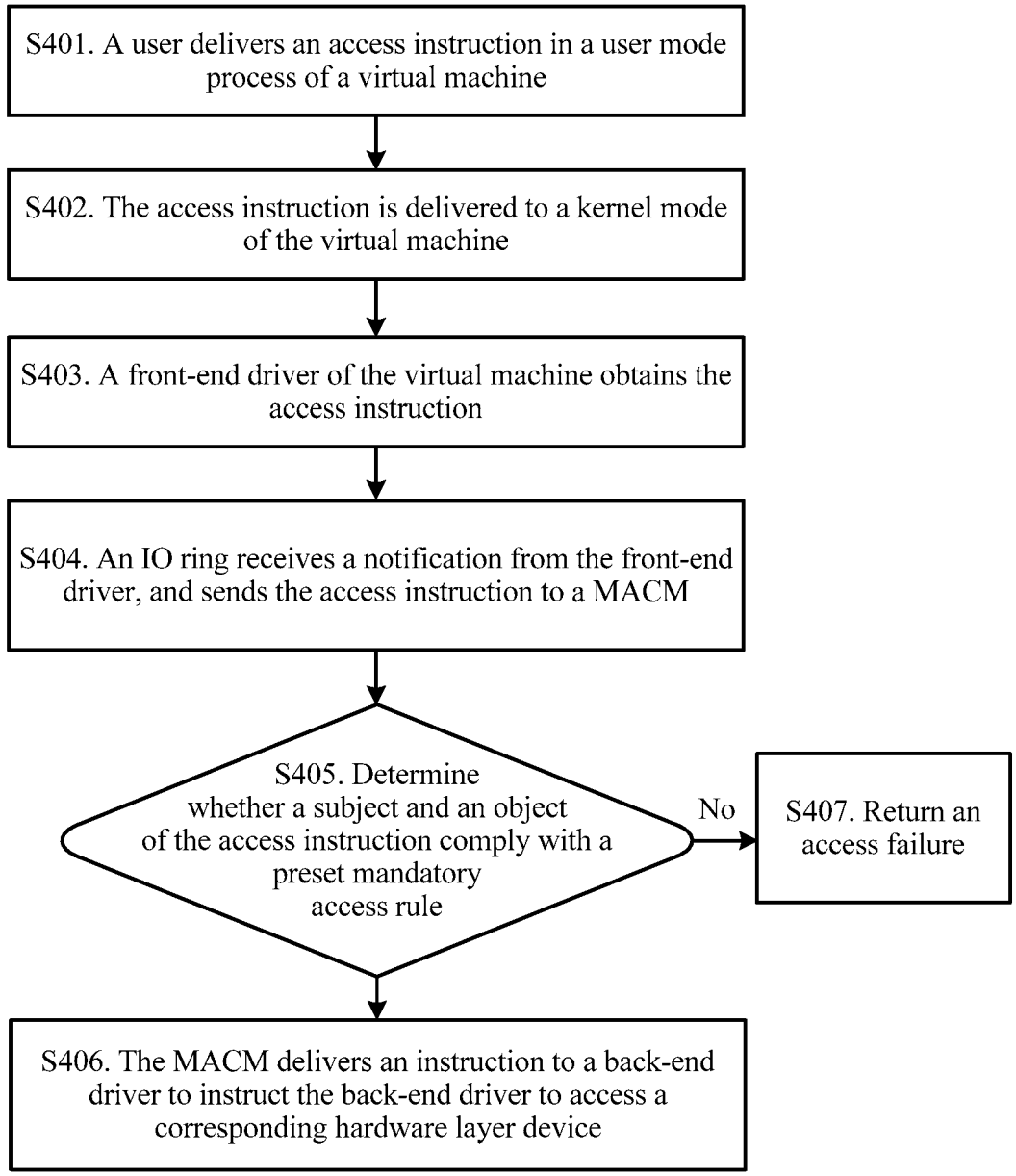
FIG. 4 is a schematic flowchart of a mandatory access control method according to another embodiment of the present application.

In this structure, a mandatory access control procedure 400 may be specifically shown in FIG. 4.

S401. A user delivers an access instruction in a user mode process of a virtual machine, where there may be multiple access instructions, and each access instruction includes an access subject and an access object.

S402. The access instruction is transferred from a user mode of the virtual machine to a kernel mode of the virtual machine.

S403. A front-end driver of the virtual machine obtains the access instruction, and notifies an IO ring that the access instruction is received. Specifically, an access subject variable "char *Subject" and an access object variable "char *Object" may be added to a data structure of the front-end driver. The front-end driver fills a user mode process name and a to-be-accessed file name in the variable Subject and the variable Object respectively.

S404. The IO ring receives a notification from the front-end driver, and sends the access instruction to a MACM by using an IO ring request. Specifically, an access instruction subject variable "char *Subject" and an access instruction object variable "char *Object" may also be accordingly added to a data structure of the IO ring request. Therefore, the IO ring request separately transmits the process name in the variable Subject and the to-be-accessed file name in the variable Object from the front-end driver to the MACM.

S405. The MACM may include an obtaining unit, a determining unit, and a storage unit. The obtaining unit may be configured to obtain the IO ring request from the front-end driver of the kernel mode of the virtual machine. The determining unit is configured to determine whether a subject and an object of an access instruction in the IO ring request comply with a preset mandatory access rule. N access instructions that comply with the mandatory access rule are determined according to a subject and an object of each of M access instructions. The storage unit is configured to store and manage mandatory access rule information, and the mandatory access rule may be specifically Bell-La Padula (BLP) model information (BLP-info). For an access instruction in which a subject and an object comply with the mandatory access rule, perform S406; or for an access instruction in which a subject and an object do not comply with the mandatory access rule, perform S407.

S406. The MACM delivers an instruction to a back-end driver, to instruct the back-end driver to access a hardware layer device corresponding to the object of each of the N access instructions. When the access succeeds, the back-end driver returns an access result to the user mode of the virtual machine level by level.

S407. For an access instruction in which a subject and an object do not comply with the mandatory access rule, a failure is returned.

Figure 5:
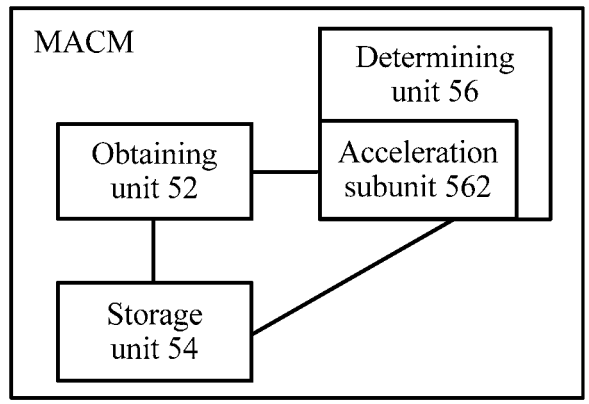
FIG. 5 is a schematic block diagram of a mandatory access control module according to an embodiment of the present application.

To reduce system performance overheads for determining whether an access subject and object in the IO ring request comply with the mandatory access rule, and accelerate the determining, an acceleration subunit may be added to the determining unit. The acceleration subunit may communicate with the obtaining unit and the storage unit. That is, as shown in FIG. 5, the MACM includes an obtaining unit 52, a storage unit 54, and a determining unit 56 (including an acceleration subunit 562).

The acceleration subunit 562 may achieve a performance purpose of accelerating access control by using a combination algorithm and/or a cache technology. When one or more virtual machines deliver a batch of accesses, the acceleration subunit may combine accesses according to a subject and an object of each access, so as to reduce a quantity of times for determining. In addition, the acceleration subunit 562 may cache a frequently-used mandatory access rule (for example, set a cache table), and first performs determining in the cache, so as to avoid frequently performing a global search on mandatory access rules in the storage unit.

The combination algorithm may be specifically as follows:

A cache area is set in a corresponding unit (such as an acceleration subunit). The cache area may be used to store accesses in IO ring requests generated during a particular time period, or store accesses in a particular quantity of IO ring requests. Accesses, in the IO ring requests, delivered by one or more virtual machines are stored according to a cache algorithm. The accesses may be stored in a table structure form, for example, implemented by using a doubly linked list structure in which "key" is a key value, "value" is a subject-object pair, and during combination, a hash table is used to search for a specific hit cache block.

When combination calculation is performed, multiple times of determining on accesses that are from the one or more virtual machines and that have a same subject security classification and a same object security classification are combined into one time of determining according to typical access models of "single-process to multiple-file" and "multiple-process to single-file". Specifically, the "single-process to multiple-file" may be used as a process cluster and the "multiple-process to single-file" may be used as a file cluster to rapidly combine multiple accesses.

Combining multiple accesses from one virtual machine (such as a first virtual machine) may include combining accesses to a same file by a same process, may include combining accesses to multiple files with a same security classification by a same process, may include combining accesses to a same file by multiple processes with a same security classification, and may further include combining accesses to multiple files with a same security classification by multiple processes with a same security classification.

Multiple accesses delivered by a same virtual machine may be combined according to whether access subjects and objects are the same. Specifically, M is a positive integer greater than or equal to 2, all the M access instructions are obtained from the first virtual machine, and S202 in which the VMM determines, according to the subject and the object of each of the M access instructions, N access instructions that comply with a preset mandatory access rule includes: combining, by the VMM, access instructions that are of the M access instructions and that have a same subject and a same object, to obtain K access instructions, where K is a positive integer less than M; and determining, by the VMM from the K access instructions according to a subject security classification and an object security classification of each of the K access instructions, the N access instructions that comply with the mandatory access rule, where N is a positive integer less than or equal to K.

In a specific example, two access instructions each with a process httpd accessing a.xml may be combined into one access instruction, and mandatory access rule determining is performed only once.

It should be understood that if a system includes multiple virtual machines and the multiple virtual machines are corresponding to a same mandatory access rule, multiple accesses from the multiple virtual machines may be combined in a combination manner similar to the foregoing combination manner, and this is not limited in this embodiment of the present application.

Multiple accesses delivered by a same virtual machine may be combined according to whether the accesses have a same subject security classification and a same object security classification. Specifically, M is a positive integer greater than or equal to 2, all the M access instructions are obtained from the first virtual machine, and S202 in which the VMM determines, according to the subject and the object of each of the M access instructions, N access instructions that comply with a preset mandatory access rule includes: combining, by the VMM, access instructions that are of the M access instructions and that have a same subject security classification and a same object security classification, to obtain K access instructions, where K is a positive integer less than M; and determining, by the VMM from the K access instructions according to a subject security classification and an object security classification of each of the K access instructions, the N access instructions that comply with the mandatory access rule, where N is a positive integer less than or equal to K.

In a specific example, if there are two access instructions in which processes httpd access a.xml and c.xml separately, and both security classifications of a.xml and c.xml are S levels, the two access instructions may be combined into one access instruction in which a process httpd accesses an S-level file, and mandatory access rule determining is performed only once. In another specific example, if there are two access instructions in which processes httpb and httpd access a.xml, and both the processes have S-level security classifications, the two access instructions may be combined into one access instruction in which an S-level process httpd accesses a file a.xml, and mandatory access rule determining is performed only once. In another specific example, if there are two access instructions in which a process httpb accesses a.xml and a process httpd accesses c.xml, and all security classifications of httpb, httpd, a.xml, and c.xml are S levels, the two access instructions may be combined into one access instruction in which an S-level process accesses an S-level file, and mandatory access rule determining is performed only once.

It should be understood that if the system includes multiple virtual machines and the multiple virtual machines are corresponding to a same mandatory access rule, multiple accesses from the multiple virtual machines may also be combined in a combination manner similar to the foregoing combination manner, and this is not limited in this embodiment of the present application. In a specific example, if a process httpd from a virtual machine A is an S-level process and accesses an S-level file, and a process SQLServer from a virtual machine B is also an S-level process and also accesses an S-level file, the accesses from the virtual machine A and the virtual machine B may be combined into one access to an S-level object by an S-level subject, and mandatory access rule determining is performed only once.

For the foregoing two possible implementations, to relatively quickly perform determining according to a mandatory access rule, the mandatory access rule may be designed as follows: The mandatory access rule includes a subject security rule, an object security rule, and a security determining rule, and the determining, by the VMM from the K access instructions according to a subject security classification and an object security classification of each of the K access instructions, the N access instructions that comply with the mandatory access rule includes: determining, by the VMM, the subject security classification of each of the K access instructions according to the subject of each of the K access instructions and the subject security rule; determining, by the VMM, the object security classification of each of the K access instructions according to the object of each of the K access instructions and the object security rule; and determining, by the VMM according to the subject security classification and the object security classification, whether each of the K access instructions complies with the security determining rule, and determining that an access instruction that complies with the security determining rule is one of the N access instructions.

The subject security rule, the object security rule, and the security determining rule are separately designed. The subject security rule includes a correspondence between a subject and a subject security classification, the object security rule includes a correspondence between an object and an object security classification, and the security determining rule includes a correspondence among a subject security classification, an object security classification, and a subject security classification-object security classification determining result. In an implementation, the subject security rule, the object security rule, and the security determining rule are respectively corresponding to three tables.

Specifically, an efficient design of the mandatory access rule may include a correspondence between a subject and a subject security classification (that is, the subject security rule), a correspondence between an object and an object security classification (that is, the object security rule), and a security determining rule. The security determining rule includes a correspondence among a subject security classification, an object security classification, and a subject security classification-object security classification determining result. If there are four levels of security classifications, only 4×4=16 security determining rules need to be saved. The VMM returns one result after performing mandatory access rule determining on all accesses.

It should be understood that the foregoing security determining rule is only an example. When different determining rules for two access manners (a read access and a write access) are considered, 32 security determining rules may be saved. When the security classification is formulated in another manner, the security determining rule may have another formulation manner, and this is not limited in this embodiment of the present application.

During specific access combination, the combination algorithm and a cache design of the mandatory access rule may be comprehensively considered. In addition, an access model of an IO ring of the virtual machine may be further considered, so as to achieve best mandatory access control acceleration.

In an example of implementation of a specific virtual IO ring structure of a virtual machine monitor Xen (another virtualization IO ring structure is similar), an IO ring on a storage front/back end is one page by default, and each page, that is, each IO ring, includes multiple access instructions. A maximum size of each access instruction is 44 k. An IO ring data structure occupies 112 bytes, and when some management data structures of the IO ring are deducted, one IO ring can save 32 access instructions (Because during implementation of the IO ring, a quantity of elements needs to be aligned in powers of 2, the quantity of access instructions included in one IO ring is the fifth power of 2, that is, 32.). A queue depth of the storage front/back end is 32, and a size of a largest access instruction is 44 k. Therefore, maximum access traffic of one IO ring request is 44 k×32=1.37 M. When an IO service model is a large-block file (greater than 44 k), the large-block file is split into multiple small blocks of 44 k to be accessed.

In addition to use of the combination algorithm, the cache technology may be used. A cache table is set for a frequently-used mandatory access rule, and the cache table is first searched, so as to accelerate determining.

When a cache table is designed, a subject, an object, and a security determining rule in a mandatory access rule need to be considered, and when a system includes multiple virtual machines, a mandatory access rule difference factor between virtual machines further needs to be considered. Subjects, objects, and security determining rules of all virtual machines may form a cache table, and access information of a previous IO ring request is used as cache content. However, the solution has several problems to be resolved.

1. When an IO service model is a large-block file (larger than 44 k), the large-block file needs to be split before being accessed. Multiple accesses in an IO ring request may have identical subjects and objects. When a cache table is designed according to the foregoing solution, information of multiple accesses in the previous IO ring request is in the cache table, and the information of multiple accesses may have identical subject information and object information. Therefore, designing the cache table according to the foregoing solution increases an access miss rate of the current IO ring request, and when a cache table is not hit, all the mandatory access rules need to be searched globally, and efficiency is low.

2. When an IO service model is a small-block file (smaller than 44 k), there is a relatively small possibility that multiple accesses in one IO ring request have a same subject and a same object. When a cache table is designed according to the foregoing solution, the cache table still includes multiple accesses that have a same subject and different objects or multiple accesses that have different subjects and a same object. When an access of the current IO ring request misses the cache table, all the mandatory access rules still need to be searched globally.

3. When a same physical host is corresponding to multiple virtual machines, whether subjects or objects are the same needs to be determined. When a cache table is designed according to the foregoing solution, different virtual machines need to perform some redundant searches and determining.

In conclusion, to resolve the problem 1, a cache table is set for a mandatory access rule in this embodiment of the present application to avoid performing multiple global searches. The cache table may set a correspondence among a subject, a subject security classification, an object, and an object security classification as a subject and object cache table, and may set a security determining rule as a security determining cache table. Both the two cache tables record information about multiple accesses in last N IO ring requests, and repeated records in the two cache tables are combined. In this way, the subject and object cache table includes no repeated record, and the subject and object cache table has a relatively large hit rate. The two cache tables, in particular, the security determining cache table, are relatively small, so as to reduce cache space occupied by the security determining rule.

In a specific example, in a cache table designed in the foregoing manner, a maximum of 32 accesses in one IO ring request may be combined into one access that has an identical subject and object, so that the security determining rule may be queried only once.

To resolve the problem 2, a correspondence between a subject and a subject security classification and a correspondence between an object and an object security classification may be further designed separately, and a subject cache table and an object cache table are designed. Repeated records in the subject cache table are combined, so as to avoid a problem in which the correspondence between a subject and a subject security classification is repeatedly searched when multiple accesses have a same subject and different objects. Likewise, repeated records in the object cache table are combined, so as to avoid a problem in which the correspondence between an object and an object security classification is repeatedly searched when multiple accesses have different subjects and a same object.

In a specific example, a maximum of 32 subjects of 32 accesses in one IO ring request may be combined (for example, when the 32 accesses that all have a same subject are combined, a subject cache table is queried once), 32 objects of the 32 accesses are combined (for example, when the 32 accesses that have two different objects are combined, an object cache table is queried twice).

In other words, to improve a hit rate of querying a mandatory access rule, a subject cache table and an object cache table are set in the mandatory access rule. The subject cache table is used to store a correspondence between subjects of last L access instructions of a user and subject security classifications, and the object cache table is used to store a correspondence between objects of the last L access instructions of the user and object security classifications. The determining, by the VMM, the subject security classification of each of the K access instructions according to the subject of each of the K access instructions and the subject security rule includes: for the subject of each of the K access instructions, determining, by the VMM, the subject security classification of each of the K access instructions according to the correspondence between the subjects and the subject security classifications in the subject cache table. The determining, by the VMM, the object security classification of each of the K access instructions according to the object of each of the K access instructions and the object security rule includes: for the object of each of the K access instructions, determining, by the VMM, the object security classification of each of the K access instructions according to the correspondence between the objects and the object security classifications in the object cache table.

A design of a cache table may be extremely flexible. In a possible design solution, a subject cache table and an object cache table are separately set for each virtual machine. The subject cache table and the object cache table are obtained by respectively extracting subjects of last L access instructions and subject security classifications, and objects of the last L access instructions and object security classifications. In another possible design solution, when multiple virtual machines have a same security determining rule, same subjects and subject security classifications or same objects and object security classifications are combined in the multiple virtual machines. The same security determining rule means that two virtual machines make a same determining result for access instructions that have a same subject security classification and a same object security classification.

In the last phase of the security determining rule design, in the multiple virtual machines, for multiple accesses that have identical subject security classifications and object security classifications, the security determining rule needs to be determined only once, and a determining result is returned layer by layer after determining. It should be understood that when there are a relatively large quantity of security determining rules, a security determining cache table may also be set. The security determining cache table is also obtained by extracting last L access instructions.

In a specific example, it is assumed that there are four levels of security classifications. A large quantity of accesses in all virtual machines are combined, and a determining result is returned (for example, 10000 to 50000 accesses are combined into 16 times of determining, and then determining results are returned).

According to the foregoing cache table design analysis, there are a large quantity of accesses that have a same subject and different objects, or have different subjects and a same object. A subject, an object, and a security determining rule are cached and designed in separate categories, so that redundant information of a cache table can be effectively reduced, and an access hit rate is improved. Preferably, as shown in Table 1 to Table 3, three types of cache tables are used for a cache table design, including a subject cache table, an object cache table, and a security determining cache table.

TABLE 1

| Subject Cache Table | |
| --- | --- |
| Subject | Subject security classification |
| httpd | S |
| . . . | . . . |

TABLE 2

Object Cache Table

| Object | Object security classification |
|---|---|
| a.xml | S |
| b.xml | T |
| . . . | . . . |

TABLE 3

Security Determining Cache Table

| Subject security classification | Object security classification | Determining result |
|---|---|---|
| S | S | Y |
| S | T | N |
| . . . | . . . | . . . |

It should be understood that Table 1 to Table 3 are only examples, each cache table may further include a field such as a virtual machine identifier to distinguish between different virtual machine situations. Each cache table may further include another necessary field, and this is not limited in this embodiment of the present application. In addition, the subject security rule, the object security rule, and the security determining rule may also exist in a format shown in Table 1 to Table 3, and a design of each field may also be similar to that shown in Table 1 to Table 3. However, this embodiment of the present application is not limited thereto.

In an implementation, M is a positive integer greater than or equal to 2. The M access instructions include P access instructions obtained from a first virtual machine and S access instructions obtained from a second virtual machine, both P and S are positive integers, and a sum of P and S is less than or equal to M. A mandatory access rule corresponding to the first virtual machine includes a first subject security rule, a first object security rule, and a first security determining rule. A mandatory access rule corresponding to the second virtual machine includes a second subject security rule, a second object security rule, and a second security determining rule. The first security determining rule and the second security determining rule are the same. The determining, by the VMM according to the subject and the object of each of the M access instructions, N access instructions that comply with a preset mandatory access rule includes: combining, by the VMM according to the first subject security rule and the first object security rule, access instructions that are of the P access instructions and that have a same subject security classification and a same object security classification, to obtain Q access instructions, where Q is a positive integer less than or equal to P; combining, by the VMM according to the second subject security rule and the second object security rule, access instructions that are of the S access instructions and that have a same subject security classification and a same object security classification, to obtain T access instructions, where T is a positive integer less than or equal to S; combining, by the VMM, access instructions that are of the Q access instructions and the T access instructions and that have a same subject security classification and a same object security classification, to obtain K access instructions, where K is a positive integer less than M; and determining, by the VMM from the K access instructions according to a subject security classification and an object security classification of each of the K access instructions, the N access instructions that comply with the first security determining rule, where N is a positive integer less than or equal to K.

In specific implementation, an access instruction may be obtained by using an IO ring and a front-end driver of a kernel mode. S201 in which a virtual machine monitor VMM obtains, from a virtual machine, M input/output access instructions delivered by a user includes: obtaining, by the VMM, the M access instructions from the front-end driver of the kernel mode of the virtual machine by using the IO ring.

Specifically, to resolve the problem 3, multiple access instructions delivered by multiple virtual machines may be combined layer by layer. For example, a virtual machine A and a virtual machine B have a same security determining rule, and the same security determining rule means that the two virtual machines make a same determining result for access instructions that have a same subject security classification and a same object security classification. For the virtual machine A, there are two access instructions. A subject of an access instruction 1 is a process 1, and an object is a file 1. A subject of an access instruction 2 is a process 2, and an object is a file 2. All security classifications of the process 1, the process 2, the file 1, and the file 2 are S levels. For the virtual machine B, there are two access instructions. A subject of an access instruction 3 is a process 3, and an object is a file 3. A subject of an access instruction 4 is a process 4, and an object is a file 4. All security classifications of the process 3, the process 4, the file 3, and the file 4 are S levels.

For the virtual machine A, the two accesses are combined into one access, and a form of the access obtained after combination may be [a subject security classification S (a subject including the process 1 and the process 2), and an object security classification S (an object including the file 1 and the file 2)]. For the virtual machine B, the two accesses are combined into one access, and a form of the access obtained after combination may be [a subject security classification S (a subject including the process 3 and the process 4), and an object security classification S (an object including the file 3 and the file 4)]. When for the virtual machine A and the virtual machine B, a same security determining result is made for the accesses to the S-level objects by the S-level subjects, for example, the same security determining result is Y (accessible), the accesses from the virtual machine A and the virtual machine B may be further combined. A combination result may be [a subject security classification S (a subject including the process 1, the process 2, the process 3, and the process 4), and an object security classification S (an object including the file 1, the file 2, the file 3, and the file 4)].

In this way, the four accesses from the virtual machine A and the virtual machine B are combined into one access, and determining needs to be performed only once.

Figure 6:
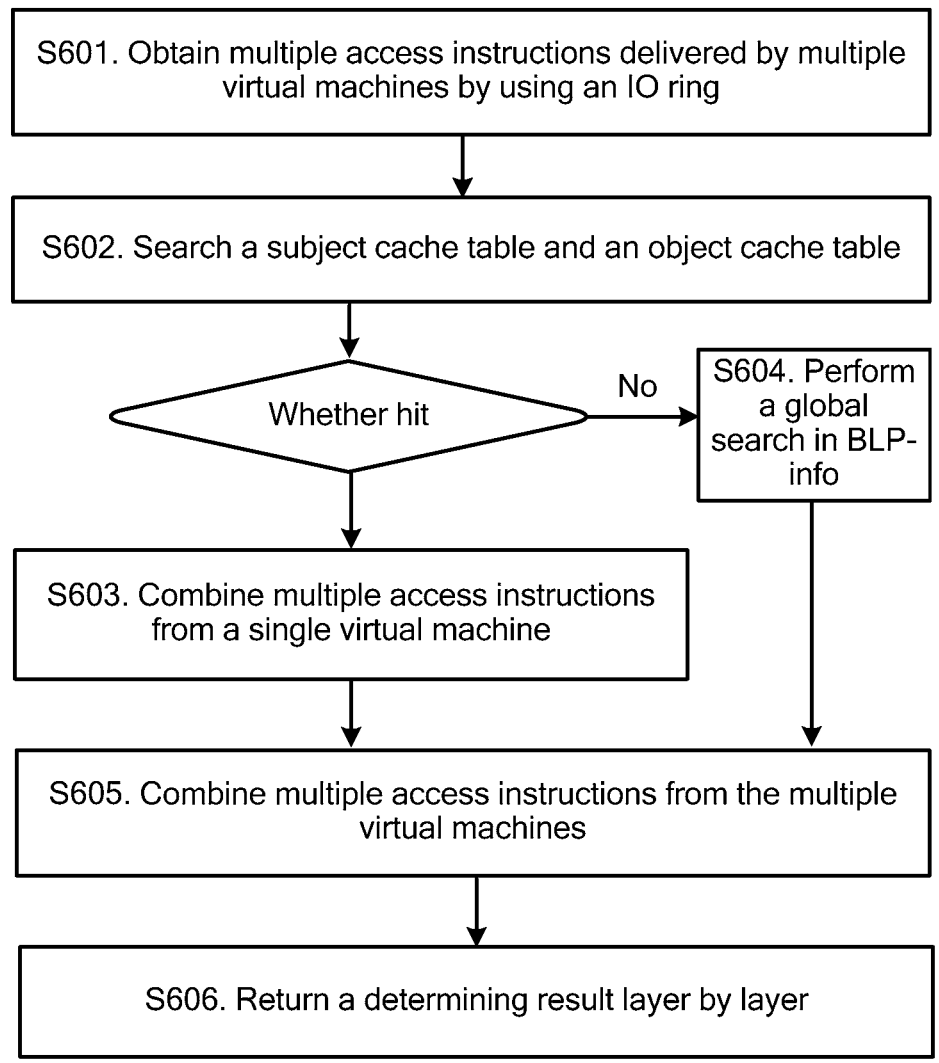
FIG. 6 is a schematic diagram of a mandatory access control procedure according to an embodiment of the present application.

FIG. 6 shows a schematic diagram of a mandatory access control procedure 600 according to an embodiment of the present application. The procedure 600 may include the following steps.

S601. Obtain multiple access instructions simultaneously delivered by multiple virtual machines by using an IO ring.

S602. In a VMM, first search, according to subjects and objects of the multiple access instructions, a subject cache table and an object cache table that are corresponding to a single virtual machine. Determine whether each access in the IO ring hits the subject cache table and the object cache table. When an access in the IO ring hits the subject cache table and the object cache table, perform S603. When an access in the IO ring misses the subject cache table and the object cache table, perform S604.

S603. Combine multiple access instructions from a single virtual machine.

S604. When an access in the IO ring misses, perform a global search in BLP-info instead, and combine accesses according to a search result.

S605. Combine multiple accesses from the multiple virtual machines according to a combination result obtained in S603 or S604.

S606. Determine, according to a security determining rule, an access obtained after combination, and return determining results together layer by layer.

After determining is completed, according to a determining result, a failure may be returned, or a hardware layer device may be accessed, and details are not described herein.

Figure 7:
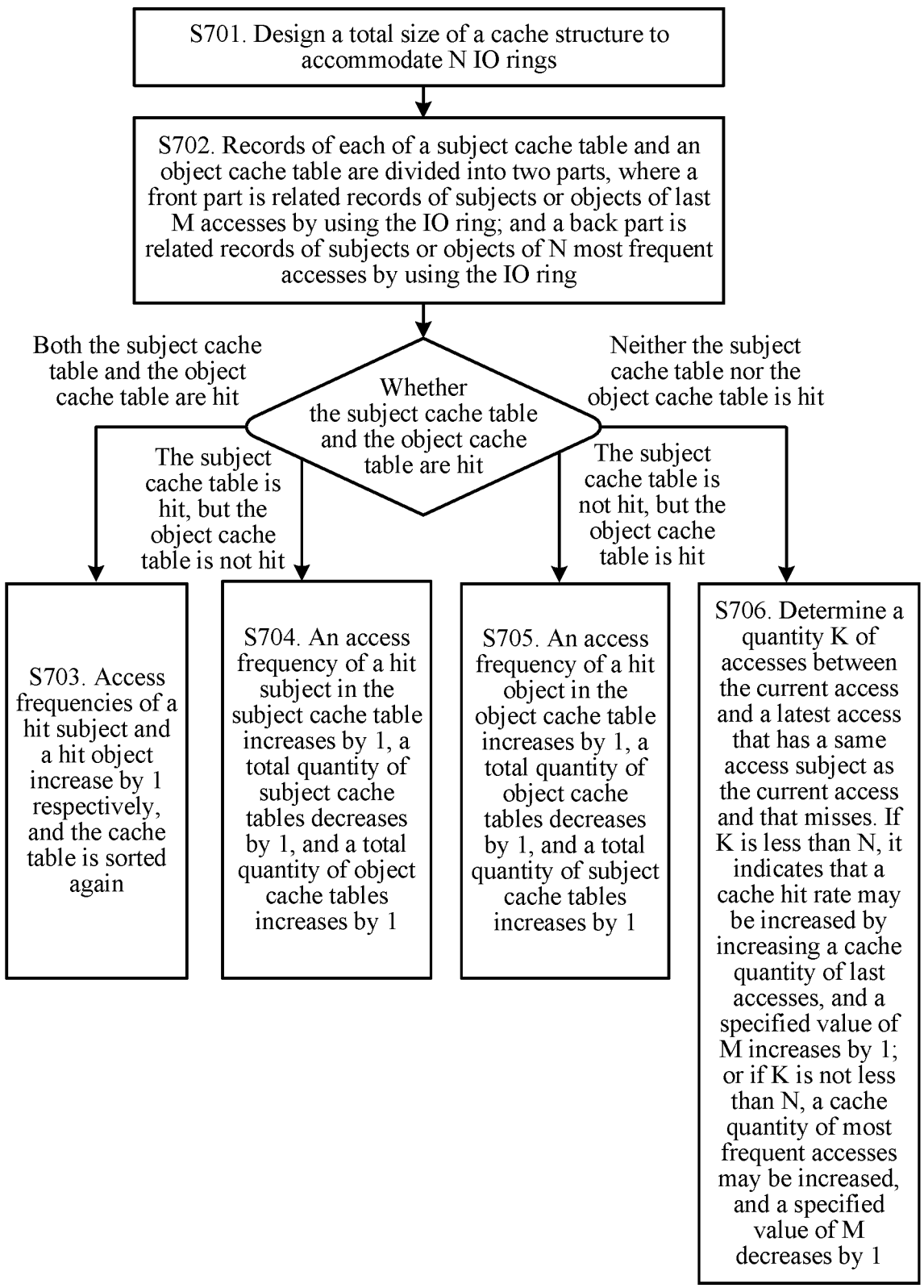
FIG. 7 is a schematic diagram of an algorithm for dynamically adjusting a subject cache table and an object cache table according to an embodiment of the present application.

When a subject cache table and an object cache table are designed, to increase a cache table hit rate, the following may be comprehensively considered: access time of a subject and an object (a latest access subject or object is first cached); access frequencies of a subject and an object (a most frequent access subject or object is first cached); and respective quantities of cached subjects and objects. Therefore, when a subject cache table and an object cache table for a cache algorithm are designed, access time, access frequencies, and cache quantities that are of subjects and objects are comprehensively considered. The subject cache table and the object cache table are dynamically adjusted according to an algorithm 700 shown in FIG. 7, so as to dynamically adjust cache factors, and achieve a best cache hit effect. The algorithm 700 may include the following steps.

S701. Design a total size of a cache structure (including a subject cache table and an object cache table) to accommodate N IO rings, where N is an integer greater than or equal to 2. Subject cache table fields include a subject, a security classification, and an access frequency; and object cache table fields include an object, a security classification, and an access frequency.

S702. Records of each of the subject cache table and the object cache table include two parts. A front part is related records of subjects or objects of last M accesses by using the IO ring, where M is an integer greater than 1 and less than N; and a back park is related records of subjects or objects of N most frequent accesses by using the IO ring. Both the front part and the back part are sorted in descending order according to access frequencies.

S703. When a subject and an object of a current access hit the subject cache table and the object cache table respectively, the cache structure does not change, access frequencies of the hit subject and object in the subject cache table and the object cache table respectively increase by 1, and the cache table is sorted again.

S704. When a subject of a current access hits the subject cache table, but an object misses the object cache table, an access frequency of the hit subject in the subject cache table increases by 1, a total quantity of subject cache tables decreases by 1, and a total quantity of object cache tables increases by 1.

S705. When a subject of a current access misses the subject cache table, but an object hits the object cache table, an access frequency of the hit object in the object cache table increases by 1, a total quantity of object cache tables decreases by 1, and a total quantity of subject cache tables increases by 1.

S706. When neither a subject nor an object of a current access hits the subject cache table or the object cache table, determine a quantity K of accesses between the current accesses and a latest access that has a same access subject as the current access and that misses. If K is less than N, it indicates that the cache hit rate may be increased by increasing a cache quantity of last accesses, and a specified value of M increases by 1; or if K is not less than N, a cache quantity of most frequent accesses may be increased, and a specified value of M decreases by 1.

The mandatory access control method in this embodiment of the present application is based on a fact that a VMM manages mandatory access control inside a virtual machine, and the VMM obtains and implements an access instruction from the virtual machine, so that implementation of the mandatory access control is more flexible, the mandatory access control is adaptable to Windows and Linux virtual machine operating systems, the operating systems do not need to be modified, and system compatibility is better. The mandatory access control method in this embodiment of the present application has fewer performance overheads, and is more favorable to delivery and deployment of a large batch of mandatory access control inside multiple virtual machines in different operating systems.

It should be understood that the method in this embodiment of the present application may be applied to a physical host, and the physical host includes a hardware layer, a VMM running on the hardware layer, and at least one virtual machine running on the VMM.

It should further be understood that sequence numbers of the foregoing processes do not mean execution sequences in the various embodiments of the present application. The execution sequences of the processes should be determined according to functions and internal logic of the processes, and should not be construed as any limitation on the implementation processes of the embodiments of the present application.

The mandatory access control method according to the embodiments of the present application is described in detail with reference to FIG. 1 to FIG. 7 in the foregoing. A mandatory access control apparatus according to an embodiment of the present application is described with reference to FIG. 8 in the following.

Figure 8:
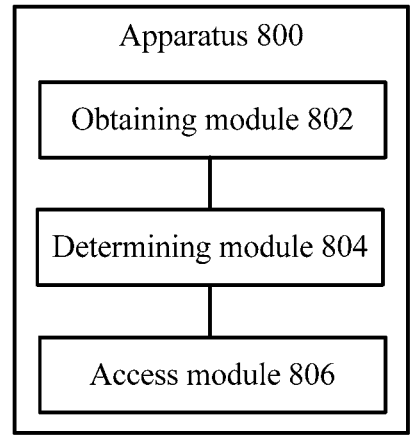
FIG. 8 is a schematic block diagram of a mandatory access control apparatus according to an embodiment of the present application.

FIG. 8 shows an apparatus 800 in this embodiment of the present application. As shown in FIG. 8, the apparatus 800 may include:

an obtaining module 802, configured to obtain, from at least one virtual machine, M input/output access instructions delivered by a user, where each of the M access instructions includes an access subject and an access object, and M is a positive integer;

a determining module 804, configured to determine, according to the subject and the object of each of the M access instructions obtained by the obtaining module 802, N access instructions that comply with a preset mandatory access rule, where N is a positive integer less than or equal to M; and an access module 806, configured to access a hardware layer device corresponding to the object of each of the N access instructions determined by the determining module 804.

The M access instructions may be generated in a user mode of the virtual machine by the user and delivered to a kernel mode of the virtual machine.

A VMM in this embodiment of the present application manages mandatory access control inside the virtual machine, and the VMM obtains and implements an access instruction from the virtual machine, so that implementation of the mandatory access control is more flexible, an operating system does not need to be modified, and system compatibility is better.

It should be understood that a sum of functions of the obtaining module 802 and the determining module 804 in this embodiment of the present application may be corresponding to a function of the foregoing mandatory access control module MACM.

Optionally, in an embodiment, M is a positive integer greater than or equal to 2, all the M access instructions are obtained from a first virtual machine, and the determining module 804 is specifically configured to: combine access instructions that are of the M access instructions and that have a same subject security classification and a same object security classification, to obtain K access instructions, where K is a positive integer less than M; and determine, from the K access instructions according to a subject security classification and an object security classification of each of the K access instructions, the N access instructions that comply with the mandatory access rule, where N is a positive integer less than or equal to K.

Optionally, in an embodiment, M is a positive integer greater than or equal to 2, all the M access instructions are obtained from a first virtual machine, and the determining module 804 is specifically configured to: combine access instructions that are of the M access instructions and that have a same subject and a same object, to obtain K access instructions, where K is a positive integer less than M; and determine, from the K access instructions according to a subject security classification and an object security classification of each of the K access instructions, the N access instructions that comply with the mandatory access rule, where N is a positive integer less than or equal to K.

Optionally, in another embodiment, the mandatory access rule includes a subject security rule, an object security rule, and a security determining rule, and that the determining module 804 determines, from the K access instructions according to the subject security classification and the object security classification of each of the K access instructions, the N access instructions that comply with the mandatory access rule includes: determining the subject security classification of each of the K access instructions according to the subject of each of the K access instructions and the subject security rule; determining the object security classification of each of the K access instructions according to the object of each of the K access instructions and the object security rule; and determining, according to the subject security classification and the object security classification, whether each of the K access instructions complies with the security determining rule, and determining that an access instruction that complies with the security determining rule is one of the N access instructions.

Optionally, in another embodiment, M is a positive integer greater than or equal to 2, the M access instructions include P access instructions obtained from a first virtual machine and S access instructions obtained from a second virtual machine, where both P and S are positive integers, and a sum of P and S is less than or equal to M, a mandatory access rule corresponding to the first virtual machine includes a first subject security rule, a first object security rule, and a first security determining rule, a mandatory access rule corresponding to the second virtual machine includes a second subject security rule, a second object security rule, and a second security determining rule, the first security determining rule and the second security determining rule are the same, and the determining module 804 is specifically configured to: combine, according to the first subject security rule and the first object security rule, access instructions that are of the P access instructions and that have a same subject security classification and a same object security classification, to obtain Q access instructions, where Q is a positive integer less than or equal to P; combine, according to the second subject security rule and the second object security rule, access instructions that are of the S access instructions and that have a same subject security classification and a same object security classification, to obtain T access instructions, where T is a positive integer less than or equal to S; combine access instructions that are of the Q access instructions and the T access instructions and that have a same subject security classification and a same object security classification, to obtain K access instructions, where K is a positive integer less than M; and determine, from the K access instructions according to a subject security classification and an object security classification of each of the K access instructions, the N access instructions that comply with the first security determining rule, where N is a positive integer less than or equal to K.

Optionally, in an embodiment, a subject cache table and an object cache table are set in the mandatory access rule. The subject cache table is used to store a correspondence between subjects of last L access instructions of a user and subject security classifications, and the object cache table is used to store a correspondence between objects of the last L access instructions of the user and object security classifications. That the determining module 804 determines the subject security classification of each of the K access instructions according to the subject of each of the K access instructions and the subject security rule includes: for the subject of each of the K access instructions, determining, by the VMM, the subject security classification of each of the K access instructions according to the correspondence between the subjects and the subject security classifications in the subject cache table. That the determining module 804 determines the object security classification of each of the K access instructions according to the object of each of the K access instructions and the object security rule includes: for the object of each of the K access instructions, determining, by the VMM, the object security classification of each of the K access instructions according to the correspondence between the objects and the object security classifications in the object cache table.

Optionally, in an embodiment, the obtaining module 802 is specifically configured to:

obtain the M access instructions from a front-end driver of the kernel mode of the virtual machine by using an IO ring.

Optionally, in an embodiment, the access module 806 is a back-end driver of the VMM.

Figure 9:
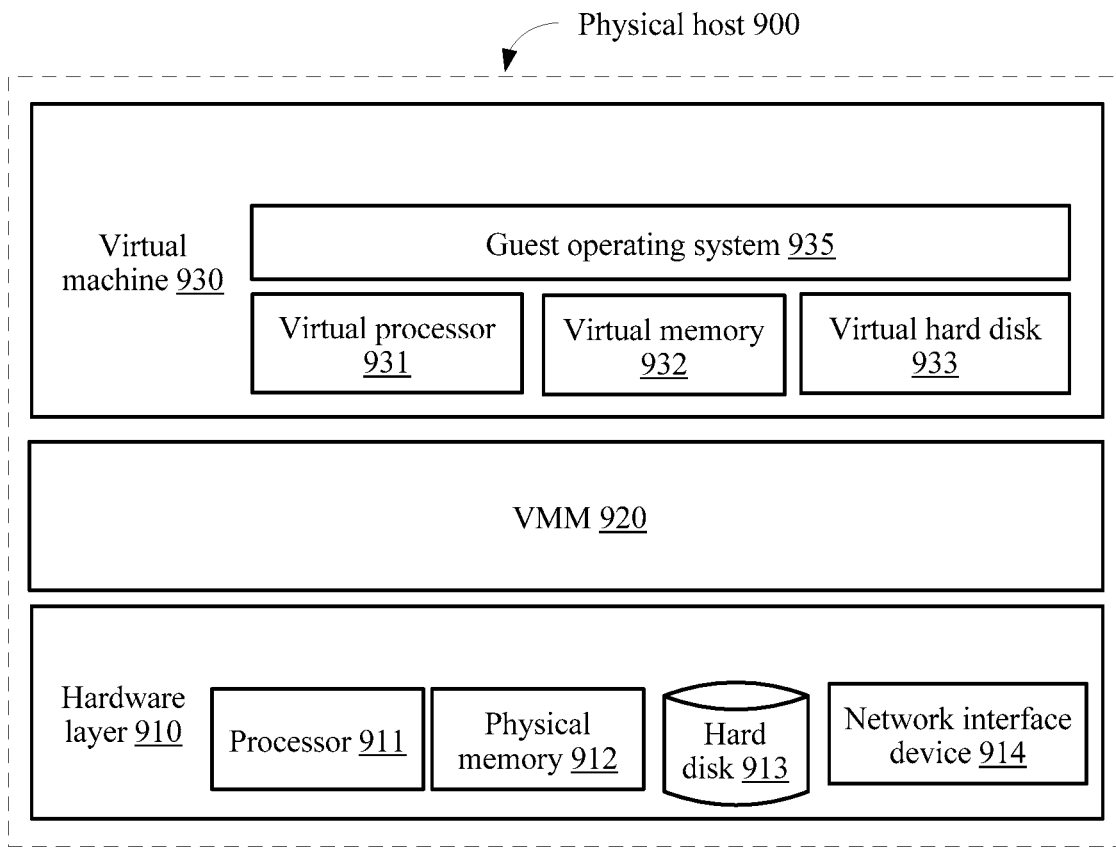
FIG. 9 is a schematic block diagram of a physical host according to an embodiment of the present application.

As shown in FIG. 9, an embodiment of the present application further provides a physical host 900, or referred to as an architecture. The physical host 900 includes a hardware layer 910, a mandatory access control apparatus running on the hardware layer 910, and at least one virtual machine 930 running on the mandatory access control apparatus. The mandatory access control apparatus is a virtual machine monitor VMM 920.

In other words, the physical host 900 includes the hardware layer 910, the virtual machine monitor VMM 920 running on the hardware layer 910, and at least one virtual machine 930 running on the VMM 920, and the VMM 920 is configured to execute the mandatory access control method in the embodiments of the present application.

The hardware layer 910 may include a processor 911, a physical memory 912, a hard disk 913, and a network interface device 914. There may be one or more processor

911. The network interface device 914 may be a network adapter or a network interface card, configured to connect to any connectable network such as the Internet or an enterprise network. The virtual machine 930 may include a virtual processor 931, a virtual memory 932, a virtual hard disk 933, and a guest operating system (Guest OS) 935. The Guest OS 935 is an operating system running on a virtual device such as the virtual processor 931, the virtual memory 932, and the virtual hard disk 933. A virtual network function 936 further runs on the Guest OS 935. The virtual machine monitor VMM 920 may be configured to implement the mandatory access control method described in the foregoing embodiments.

It should be understood that in addition to a virtual machine architecture, the method in the embodiments of the present application may be further applied to an application container engine Docker architecture or another container virtualization architecture. Compared with the virtual machine architecture, a system architecture for container virtualization, such as Docker, performs relatively poorly in terms of security and isolation, and more urgently needs protection from mandatory access control.

Figure 10:
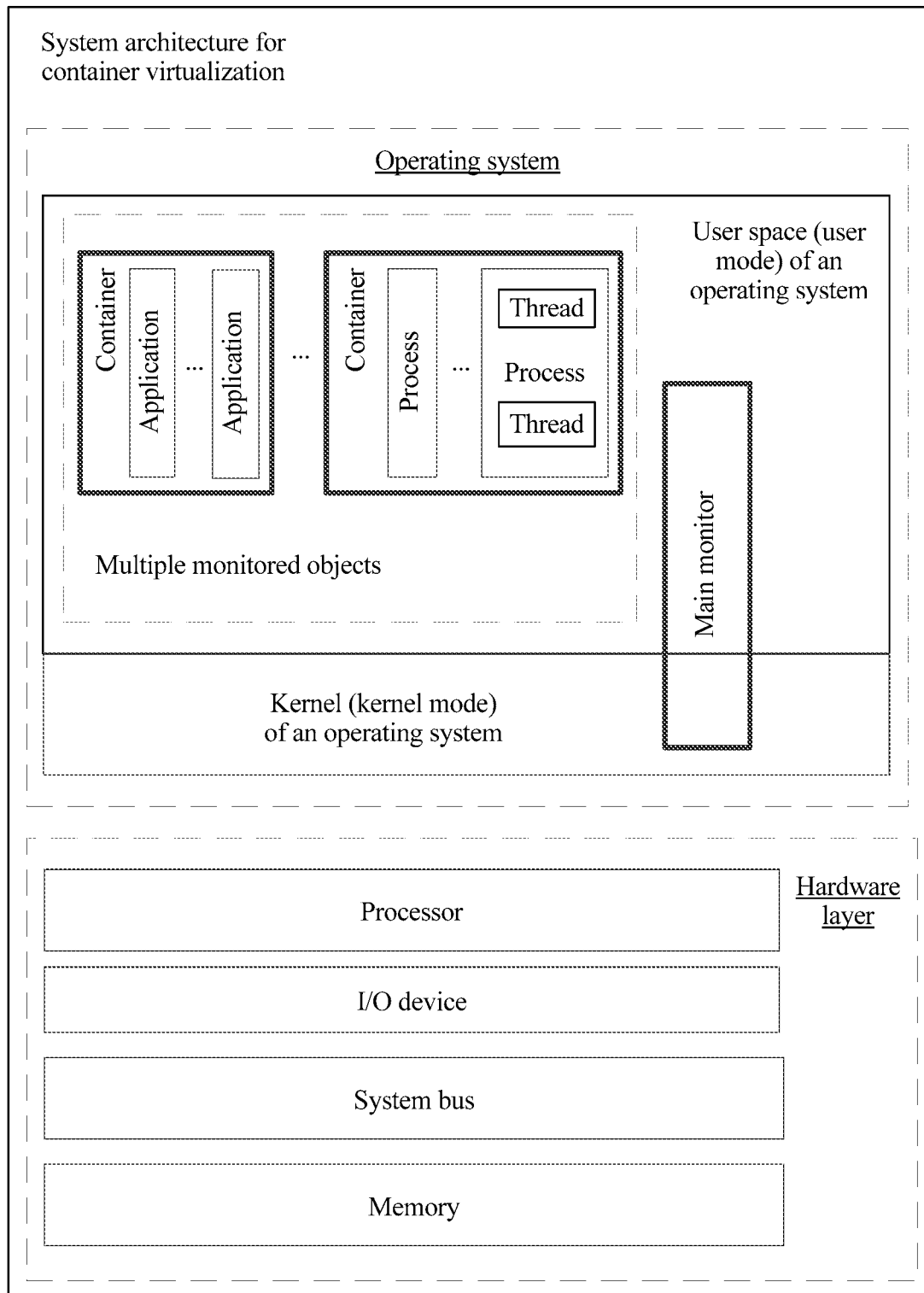
FIG. 10 is a schematic block diagram of a system architecture for container virtualization.

FIG. 10 shows a schematic block diagram of a system architecture for container virtualization. The system architecture may be understood as a physical host, and the physical host may be a single node, or may be a network element in a network. The system architecture includes an operating system and a hardware layer.

The operating system may be divided into user space (a user mode) of the operating system and a kernel (a kernel mode) of the operating system.

A container may run on a virtual machine, or may directly run on a physical host, and this is not limited in this embodiment of the present application. Relative to a virtual machine, the physical host is an entity computer having a hardware environment.

A main monitor is a module having a monitoring capability, and may be divided into a user mode part and a kernel mode part. The user mode part runs on the user mode of the operating system, and the kernel mode part runs on the kernel mode of the operating system. Further, a manager may be included. The manager is a module configured to process a monitored object in an abnormal service state. The manager may also be divided into a user mode part and a kernel mode part (a kernel mode is a main part). The user mode part runs on the user mode of the operating system, and the kernel mode part runs on the kernel mode of the operating system. The hardware layer may include a processor, a memory, a bus, and an I/O device (input/output device), and an upper-layer operating system completes various tasks by invoking hardware layer resources. Specifically, if the physical host is a network element in a network, one or more physical hosts (such as application servers) may form a service environment, one or more containers serving an application run in the service environment.

A function of the operating system in the system architecture for container virtualization may be similar to that of a virtual machine in a virtual machine architecture. An application, a process, and a thread in the container may be similar to an application, a process, and a thread corresponding to a user mode of the virtual machine in the virtual machine architecture. A function of the main monitor in the system architecture for container virtualization may be similar to that of a virtual machine monitor in the virtual machine architecture. The hardware layer in the system architecture for container virtualization is consistent with a hardware layer in the virtual machine architecture. Therefore, the method in the embodiments of the present application may also be applied to a system architecture for container virtualization, such as Docker, and specific application is not described in detail herein.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes some instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of the present application shall be subject to the protection scope of the claims.

What is claimed is:

1. A mandatory access control method, comprising:
obtaining, by a virtual machine monitor (VMM) from a front-end driver of a kernel mode of at least one virtual machine by using an input/output (IO) ring, M access instructions delivered by a user, wherein each of the M access instructions comprises an access subject and an access object, and M is a positive integer;
determining, by the VMM according to the subject and the object of each of the M access instructions, N access instructions that comply with a preset mandatory access rule, wherein the preset mandatory access rule comprises a subject security rule, an object security rule, and a security determining rule, and wherein N is a positive integer less than or equal to M; and
accessing, by the VMM, a hardware layer device corresponding to the object of each of the N access instructions.

2. The method according to claim 1, wherein M is a positive integer greater than or equal to 2, the M access instructions are obtained from a first virtual machine, and wherein the determining, by the VMM according to the subject and the object of each of the M access instructions, N access instructions that comply with a preset mandatory access rule comprises:
combining, by the VMM, access instructions from the M access instructions that have a same subject security classification and a same object security classification to obtain K access instructions, wherein K is a positive integer less than M; and
determining, by the VMM from the K access instructions according to a subject security classification and an object security classification of each of the K access instructions, the N access instructions that comply with the preset mandatory access rule, wherein N is a positive integer less than or equal to K.

3. The method according to claim 2, wherein the determining, by the VMM from the K access instructions according to a subject security classification and an object security classification of each of the K access instructions, the N access instructions that comply with the preset mandatory access rule comprises:
determining, by the VMM, the subject security classification of each of the K access instructions according to the subject of each of the K access instructions and the subject security rule;
determining, by the VMM, the object security classification of each of the K access instructions according to the object of each of the K access instructions and the object security rule;
determining, by the VMM according to the subject security classification and the object security classification, whether each of the K access instructions complies with the security determining rule; and
determining, by the VMM, that an access instruction that complies with the security determining rule is one of the N access instructions.

4. The method according to claim 3, wherein the preset mandatory access rule includes a subject cache table and an object cache table, the subject cache table is used to store a correspondence between subjects of last L access instructions of the user and subject security classifications, and the object cache table is used to store a correspondence between objects of the last L access instructions of the user and object security classifications,
wherein the determining, by the VMM, the subject security classification of each of the K access instructions according to the subject of each of the K access instructions and the subject security rule comprises:
determining, by the VMM for the subject of each of the K access instructions, the subject security classification of each of the K access instructions according to the correspondence between the subjects and the subject security classifications in the subject cache table; and
wherein the determining, by the VMM, the object security classification of each of the K access instructions according to the object of each of the K access instructions and the object security rule comprises:
determining, by the VMM for the object of each of the K access instructions, the object security classification of each of the K access instructions according to the correspondence between the objects and the object security classifications in the object cache table.

5. The method according to claim 1, wherein M is a positive integer greater than or equal to 2, the M access instructions are obtained from a first virtual machine, and wherein the determining, by the VMM according to the subject and the object of each of the M access instructions, N access instructions that comply with a preset mandatory access rule comprises:
combining, by the VMM, access instructions from the M access instructions that have a same subject and a same object to obtain K access instructions, wherein K is a positive integer less than M; and
determining, by the VMM from the K access instructions according to a subject security classification and an object security classification of each of the K access instructions, the N access instructions that comply with the preset mandatory access rule, wherein N is a positive integer less than or equal to K.

6. The method according to claim 1, wherein M is a positive integer greater than or equal to 2, the M access instructions comprise P access instructions obtained from a first virtual machine and S access instructions obtained from a second virtual machine, both P and S are positive integers, a sum of P and S is less than or equal to M, a first mandatory access rule corresponding to the first virtual machine comprises a first subject security rule, a first object security rule, and a first security determining rule, a second mandatory access rule corresponding to the second virtual machine comprises a second subject security rule, a second object security rule, and a second security determining rule, and the first security determining rule and the second security determining rule are the same; and the method further comprises:
determining, by the VMM according to the subject and the object of each of the M access instructions, R access instructions that comply with the first mandatory access rule or the second mandatory access rule,
wherein determining the R access instructions that comply with the first mandatory access rule or the second mandatory access rule comprises:
combining, by the VMM according to the first subject security rule and the first object security rule, access instructions from the P access instructions that have a same subject security classification and a same object security classification to obtain Q access instructions, wherein Q is a positive integer less than or equal to P;

combining, by the VMM according to the second subject security rule and the second object security rule, access instructions from the S access instructions that have a same subject security classification and a same object security classification to obtain T access instructions, wherein T is a positive integer less than or equal to S;

combining, by the VMM, access instructions from the Q access instructions and the T access instructions that have a same subject security classification and a same object security classification to obtain K access instructions, wherein K is a positive integer less than M; and determining, by the VMM from the K access instructions according to a subject security classification and an object security classification of each of the K access instructions, the R access instructions that comply with the first security determining rule, wherein R is a positive integer less than or equal to K.

7. The method according to claim 1, wherein the method is applied to a physical host, and the physical host comprises a hardware layer, the VMM running on the hardware layer, and the at least one virtual machine running on the VMM.

8. A mandatory access control apparatus, wherein the apparatus is applied to a physical host, a virtual machine runs on the physical host, and the apparatus comprises:
at least one processor; and
a non-transitory computer-readable storage medium coupled to the at least one processor and storing programming instructions for execution by the at least one processor, the programming instructions instruct the at least one processor to:
obtain, from a front-end driver of a kernel mode of at least one virtual machine by using an input/output (IO) ring, M access instructions delivered by a user, wherein each of the M access instructions comprises an access subject and an access object, and M is a positive integer;
determine, according to the subject and the object of each of the M access instructions, N access instructions that comply with a preset mandatory access rule, wherein the preset mandatory access rule comprises a subject security rule, an object security rule, and a security determining rule, and wherein N is a positive integer less than or equal to M; and
access a hardware layer device corresponding to the object of each of the N access instructions.

9. The apparatus according to claim 8, wherein M is a positive integer greater than or equal to 2, the M access instructions are obtained from a first virtual machine, and the programming instructions further instruct the at least one processor to:
combine access instructions from the M access instructions that have a same subject security classification and a same object security classification to obtain K access instructions, wherein K is a positive integer less than M; and
determine, from the K access instructions according to a subject security classification and an object security classification of each of the K access instructions, the N access instructions that comply with the preset mandatory access rule, wherein N is a positive integer less than or equal to K.

10. The apparatus according to claim 9, wherein determining, from the K access instructions according to the subject security classification and the object security classification of each of the K access instructions, the N access instructions that comply with the preset mandatory access rule comprises:
determining the subject security classification of each of the K access instructions according to the subject of each of the K access instructions and the subject security rule;
determining the object security classification of each of the K access instructions according to the object of each of the K access instructions and the object security rule;
determining, according to the subject security classification and the object security classification, whether each of the K access instructions complies with the security determining rule; and
determining that an access instruction that complies with the security determining rule is one of the N access instructions.

11. The apparatus according to claim 10, wherein the preset mandatory access rule includes a subject cache table and an object cache table, the subject cache table is used to store a correspondence between subjects of last L access instructions of the user and subject security classifications, and the object cache table is used to store a correspondence between objects of the last L access instructions of the user and object security classifications,
wherein determining the subject security classification of each of the K access instructions according to the subject of each of the K access instructions and the subject security rule comprises:
determining, for the subject of each of the K access instructions, the subject security classification of each of the K access instructions according to the correspondence between the subjects and the subject security classifications in the subject cache table; and
wherein determining the object security classification of each of the K access instructions according to the object of each of the K access instructions and the object security rule comprises:
determining, for the object of each of the K access instructions, the object security classification of each of the K access instructions according to the correspondence between the objects and the object security classifications in the object cache table.

12. The apparatus according to claim 8, wherein M is a positive integer greater than or equal to 2, the M access instructions are obtained from a first virtual machine, and the programming instructions further instruct the at least one processor to:
combine access instructions from the M access instructions that have a same subject and a same object to obtain K access instructions, wherein K is a positive integer less than M; and
determine, from the K access instructions according to a subject security classification and an object security classification of each of the K access instructions, the N access instructions that comply with the preset mandatory access rule, wherein N is a positive integer less than or equal to K.

13. The apparatus according to claim 8, wherein M is a positive integer greater than or equal to 2, the M access instructions comprise P access instructions obtained from a first virtual machine and S access instructions obtained from a second virtual machine, both P and S are positive integers, a sum of P and S is less than or equal to M, a first mandatory access rule corresponding to the first virtual machine comprises a first subject security rule, a first object security rule, and a first security determining rule, a second mandatory access rule corresponding to the second virtual machine comprises a second subject security rule, a second object security rule, and a second security determining rule, and the first security determining rule and the second security determining rule are the same; and the programming instructions further instruct the at least one processor to:

combine, according to the first subject security rule and the first object security rule, access instructions from the P access instructions that have a same subject security classification and a same object security classification to obtain Q access instructions, wherein Q is a positive integer less than or equal to P;

combine, according to the second subject security rule and the second object security rule, access instructions from the S access instructions that have a same subject security classification and a same object security classification to obtain T access instructions, wherein T is a positive integer less than or equal to S;

combine, access instructions from the Q access instructions and the T access instructions that have a same subject security classification and a same object security classification to obtain K access instructions, wherein K is a positive integer less than M; and determine, from the K access instructions according to a subject security classification and an object security classification of each of the K access instructions, the R access instructions that comply with the first security determining rule, wherein R is a positive integer less than or equal to K.

14. A physical host, comprising a hardware layer, a virtual machine monitor (VMM) running on the hardware layer, and at least one virtual machine running on the VMM, wherein the VMM is configured to:

obtain, from a front-end driver of a kernel mode of the at least one virtual machine by using an input/output (IO) ring, M access instructions delivered by a user, wherein each of the M access instructions comprises an access subject and an access object, and M is a positive integer;

determine N access instructions that comply with a preset mandatory access rule, wherein the preset mandatory access rule comprises a subject security rule, an object security rule, and a security determining rule, and wherein N is a positive integer less than or equal to M; and access a hardware layer device corresponding to the object of each of the N access instructions.

15. The physical host according to claim 14, wherein M is a positive integer greater than or equal to 2, the M access instructions are obtained from a first virtual machine, and wherein determining the N access instructions that comply with the preset mandatory access rule comprises:

combining access instructions from the M access instructions that have a same subject security classification and a same object security classification to obtain K access instructions, wherein K is a positive integer less than M; and determining, from the K access instructions according to a subject security classification and an object security classification of each of the K access instructions, the N access instructions that comply with the preset mandatory access rule, wherein N is a positive integer less than or equal to K.

16. The physical host according to claim 14, wherein M is a positive integer greater than or equal to 2, the M access instructions are obtained from a first virtual machine, and wherein determining the N access instructions that comply with the preset mandatory access rule comprises:

combining access instructions from the M access instructions that have a same subject and a same object to obtain K access instructions, wherein K is a positive integer less than M; and determining, from the K access instructions according to a subject security classification and an object security classification of each of the K access instructions, the N access instructions that comply with the preset mandatory access rule, wherein N is a positive integer less than or equal to K.

* * * * *